(12) United States Patent
Helmersson

(10) Patent No.: US 6,415,011 B1
(45) Date of Patent: Jul. 2, 2002

(54) SPACER AND A FUEL ASSEMBLY FOR A NUCLEAR BOILING WATER REACTOR

(75) Inventor: Sture Helmersson, Kolbäck (SE)

(73) Assignee: Westinghouse Atom AB (SE)

(*) Notice: Subject to any disclaimer, the term of this patent is extended or adjusted under 35 U.S.C. 154(b) by 0 days.

(21) Appl. No.: 09/388,387

(22) Filed: Sep. 1, 1999

(30) Foreign Application Priority Data

Sep. 18, 1998 (SE) ................................................ 9803177

(51) Int. Cl.⁷ .............................................. G21C 3/322
(52) U.S. Cl. .................... 376/439; 376/435; 376/441; 376/442; 376/443; 376/454
(58) Field of Search ............................... 376/439, 441, 376/443, 435, 454, 442

(56) References Cited

U.S. PATENT DOCUMENTS

| | | | | |
|---|---|---|---|---|
| 3,344,855 A | * | 10/1967 | Clark | 165/159 |
| 3,393,128 A | * | 7/1968 | Obertelli et al. | 176/78 |
| 3,787,286 A | | 1/1974 | Anthony | 176/78 |
| 4,061,536 A | | 12/1977 | Creagan et al. | 176/78 |
| 5,112,571 A | * | 5/1992 | Orii et al. | 376/439 |
| 5,229,068 A | * | 7/1993 | Johansson et al. | 376/371 |
| 5,272,741 A | * | 12/1993 | Masuhara et al. | 376/439 |
| 5,283,821 A | * | 2/1994 | Karoutas | 376/439 |
| 5,327,472 A | * | 7/1994 | Kraemer et al. | 376/439 |
| 5,375,153 A | * | 12/1994 | Patterson et al. | 376/435 |
| 5,416,812 A | * | 5/1995 | Matzner | 376/371 |
| 5,530,729 A | * | 6/1996 | Gustafsson | 376/439 |
| 5,668,728 A | * | 9/1997 | Dix et al. | 376/443 |
| 5,862,196 A | * | 1/1999 | Wolfram | 376/439 |

FOREIGN PATENT DOCUMENTS

| | | | | |
|---|---|---|---|---|
| DE | 40 06 264 A1 | 8/1991 | | G21C/3/322 |
| EP | 0 026 029 | 7/1980 | | G21C/3/32 |
| FR | 2163677 | 12/1972 | | G21C/3/00 |
| SE | 7311072-8 | 4/1975 | | G21C/3/34 |
| SE | 503 776 | 9/1996 | | G21C/3/34 |

\* cited by examiner

Primary Examiner—Michael J. Carone
Assistant Examiner—John Richardson
(74) Attorney, Agent, or Firm—Connolly Bove Lodge & Hutz LLP

(57) ABSTRACT

The invention concerns a spacer (14) for a nuclear boiling water reactor. The spacer (14) comprises a plurality of cells (16) for holding or allowing elongated elements (12) to pass through the cells. Between the cells (16) there are a plurality of flow channels (18). The spacer comprises at least a plurality of deflecting members (22). The deflecting member comprises a vane (24) which extends in a direction from a cell (16) into the neighbouring flow channel (18). The vane is inclined relative to a vertical plane (26) and is wider in its upper part than in its lower part. The invention also concerns a fuel assembly for a nuclear boiling water reactor, comprising a deflecting member with vane of similar construction.

15 Claims, 4 Drawing Sheets

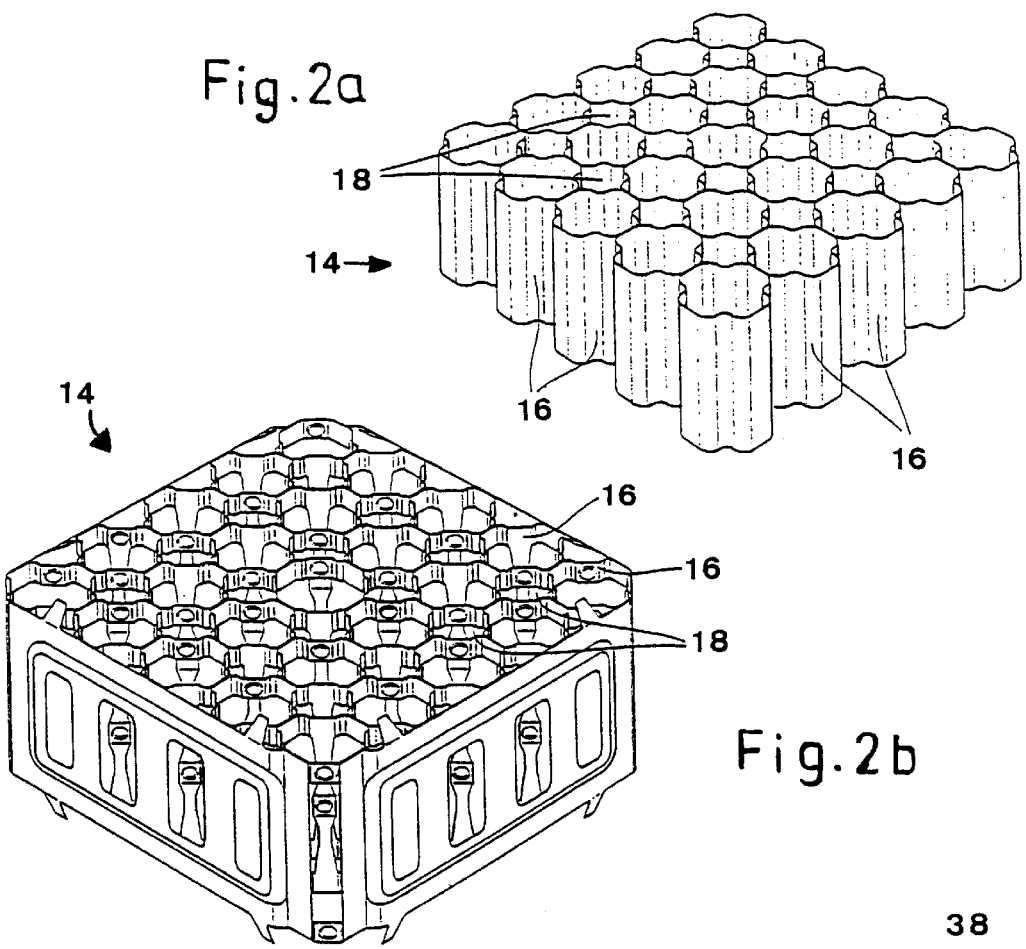
Fig. 2a
Fig. 2b
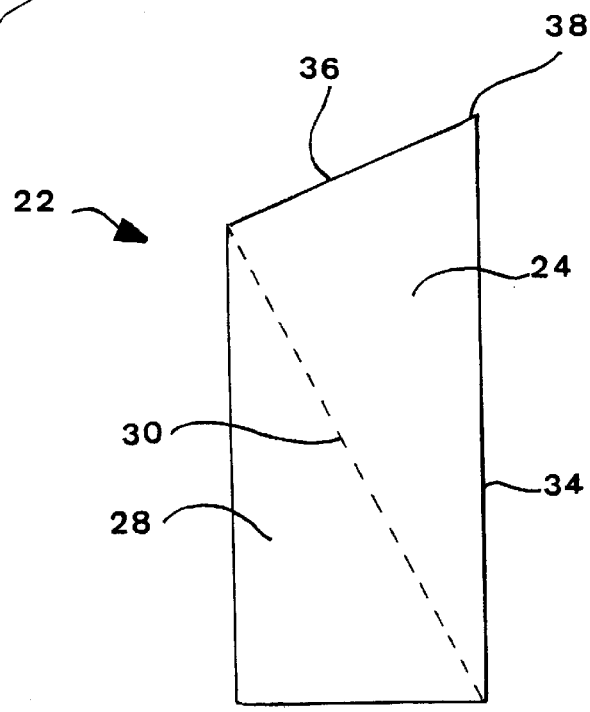
Fig. 3

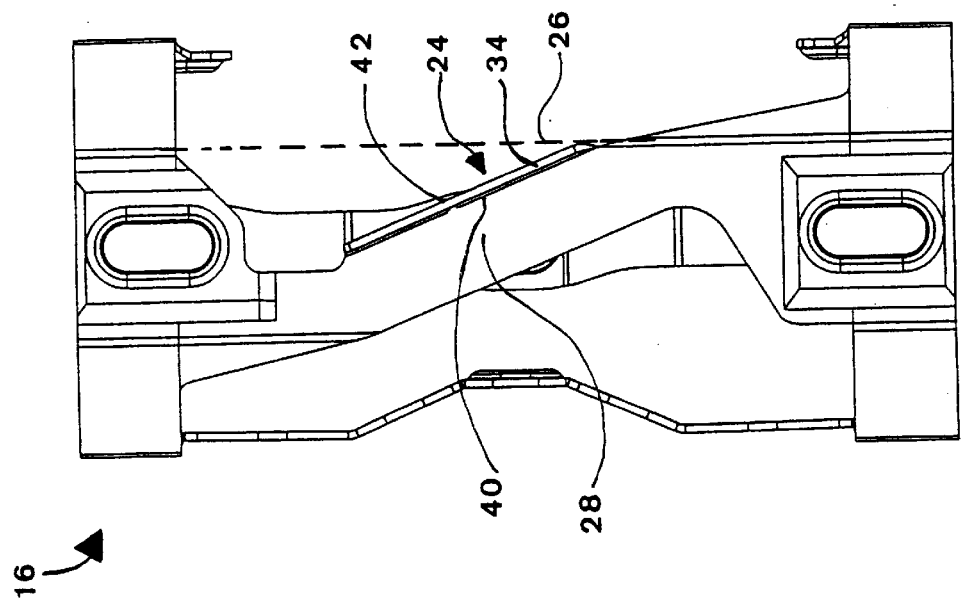
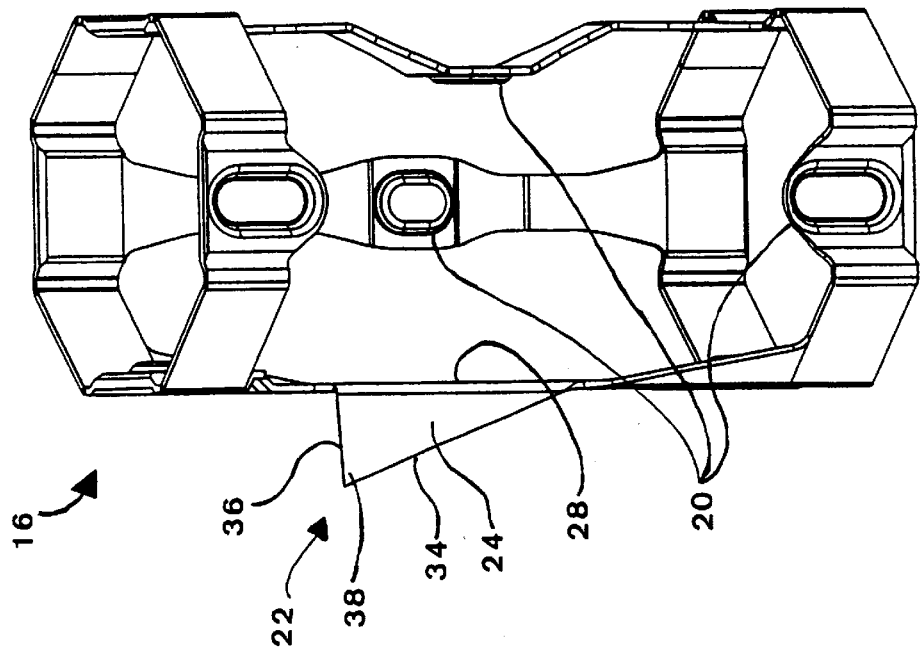

SPACER AND A FUEL ASSEMBLY FOR A NUCLEAR BOILING WATER REACTOR

BACKGROUND OF THE INVENTION AND PRIOR ART

The present invention concerns a spacer for a nuclear boiling water reactor, comprising a plurality of cells for holding parallel elongated elements extending through the cells or for allowing said elements to pass through the cells, wherein a plurality of flow channels are defined between the cells, which flow channels allow a cooling medium to flow therethrough, wherein when the spacer is in use in a nuclear boiling water reactor, the elongated elements extend in an essentially vertical direction and the flow of the cooling medium takes place mainly in a vertical direction upwards, which spacer comprises a plurality of deflecting members which are arranged to deflect the flow of the cooling medium. The invention also concerns a fuel assembly for a nuclear boiling water reactor.

When in the present description and in the following claims flow channels are mentioned in connection with spacers, it is not only referred to the flow channel which is formed in the spacer itself but also to the axial extension of this flow channel, i.e., when the spacer is arranged in a fuel assembly, the flow channels which are formed between the fuel rods.

Figure 1:
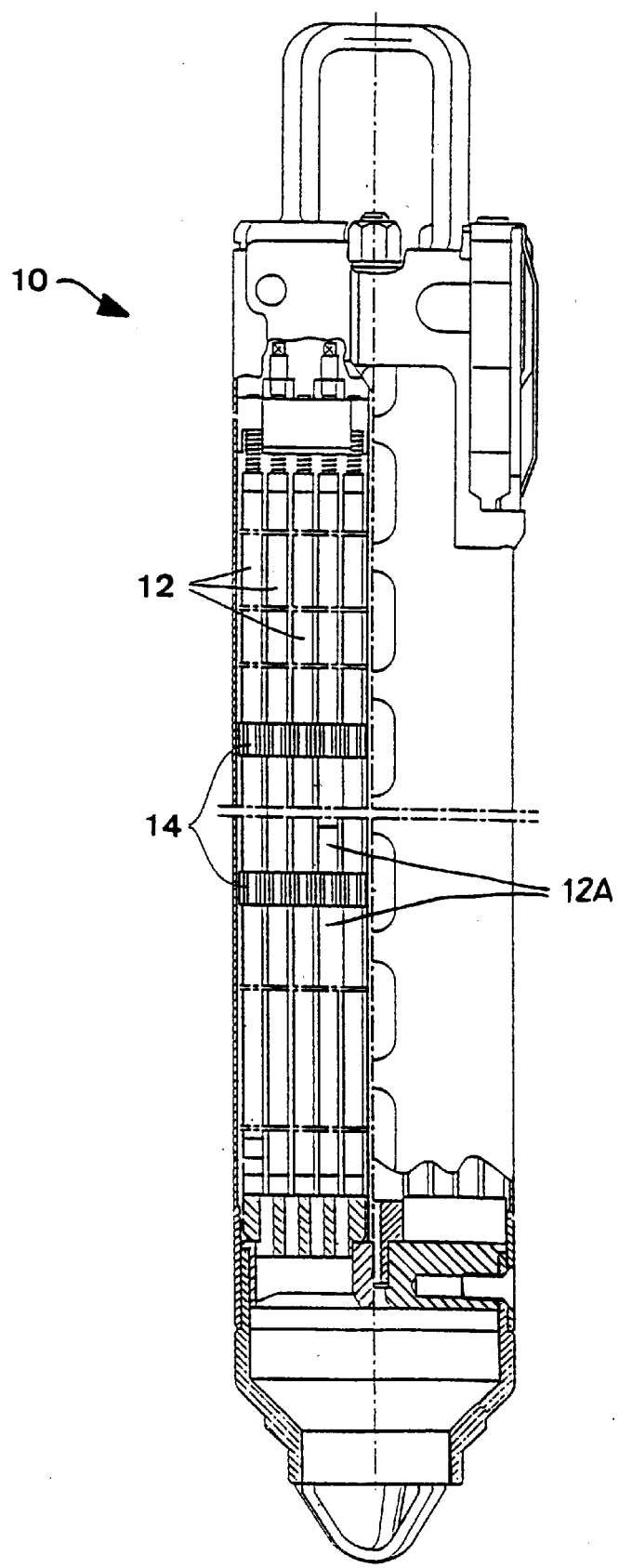

A boiling water reactor comprises normally a number of fuel assemblies. A fuel assembly comprises a number of elongated fuel rods. FIG. 1 shows an example of a fuel assembly. The fuel assembly is here generally indicated by 10 and the fuel rods are indicated by 12. In order to hold the fuel rods in position and at predetermined distances from each other, the fuel assembly comprises a number of spacers, which in FIG. 1 are indicated by 14. The spacers may have different shapes. FIG. 2a and FIG. 2b show two examples of how a spacer may be designed. A spacer thus comprises a plurality of cells for holding elongated elements, for example fuel rods or guide tubes for control rods, which extend through the cells. Between the cells a number of flow channels 18 extend, which flow channels allow a cooling medium, usually water, to flow therethrough. The fuel assemblies are usually arranged vertically in the nuclear boiling water reactor. Also the fuel rods are thus arranged vertically. The fuel assembly is open in both ends so that the cooling medium may flow through the fuel assembly. The cooling medium thereby usually flows upwards.

In a boiling water reactor, steam is formed close to the fuel rods. Thereby the cooling of the fuel rods is impaired. In order to improve the cooling it is already known that the spacer comprises a number of deflecting members which are arranged for deflecting the flow of the cooling medium. Examples of such deflecting members may be found in SE-C2-503 776. This document shows that a number of deflecting members are arranged such that they are surrounded by the cells and separated axially in order to step by step deflect and control at least a part of the flow of the cooling medium towards the fuel rods. The deflecting members are centrally arranged in the flow channels and have an almost triangular shape and are narrower in their upper part.

There also exists another kind of spacer (a so-called intermediate spacer) which does not have the purpose of holding the fuel rods, but which only has the purpose of holding the deflecting members in position in the flow channels between the fuel rods. Such a kind of spacer comprises cells which allow the fuel rods to pass through the cells without holding them. When "spacer" is mentioned in this description and in the following claims, this expression also includes so-called intermediate spacers.

In the previously known spacers, the deflecting members are normally symmetrically arranged in the flow channels. By symmetrically arranged in the flow channel is ment, for example, that if the flow channel is limited by four sides, then there are two or four deflecting members arranged in the flow channel. If there are two deflecting members, then these are arranged on opposite sides. If there are four deflecting members, then theses are arranged on one side each of the four sides which limit the flow channel. Furthermore, the angle of inclination and the size of the different deflecting members are the same such that symmetry is achieved in the device.

In previously known spacers with deflecting members, the deflecting members cause a relatively uncontrolled turbulence in the flow of the cooling medium. This turbulence may lead to an unwanted, relatively high, pressure drop in the reactor.

Different deflecting members are also known in connection with pressure water reactors. For example U.S. Pat. No. 5,440,599 shows deflecting members for a pressure water reactor. The deflecting members extend from the middle of the flow channels and are directed towards the fuel rods. A pressure water reactor has a completely different principle of operation than a boiling water reactor. Inter alia, in a pressure water reactor no (or minimal) steam generation takes place. The spacer construction in a pressure water reactor is thus normally not directly applicable to a boiling water reactor.

SUMMARY OF THE INVENTION

The purpose with the present invention is to achieve an improved, controlled deflection of the cooling medium towards the fuel rods, and to avoid unwanted formation of turbulence which may impair the cooling and which causes a pressure drop in the boiling water reactor.

This purpose is achieved with the spacer as initially defined in that a plurality of said deflecting members comprises a vane which extends in a direction from a cell into the neighbouring flow channel, wherein the vane is inclined relative to a vertical plane and wherein the vane is wider in its upper part that in its lower part.

In the upper part of the fuel assembly where a considerable amount of the cooling medium (water) has been converted into steam, the remaining part of the cooling medium exists as a film on the surfaces of the fuel rods and as drops in the steam flow. If the film of the cooling medium is not maintained, an isolating steam layer is formed which leads to a quick increase in temperature and to a destroyed enclosure of the fuel, a so-called dryout. A way of improving the film of the cooling medium with the help of drops in the steam flow improves the margin against dryout and has a considerable economical value and a considerable value for safety reasons.

It has become apparent that with the previously known spacers, different vortices may be formed at different edges of the projecting deflecting members or at different deflecting members in the flow channel. These different vortex formations may disturb or act against each other. This may lead to the effect that the cooling medium is not efficiently deflected towards the fuel rods. The steam which is formed around the fuel rods is therefore not substituted by the cooling medium. Steam therefore stays around the fuel rods which, as has been described above, leads to an increased risk for a dryout. That is, the dryout performance of the reactor becomes worse. Furthermore, the different vortex formations may lead to an increased pressure drop in the reactor. These problems with previously known spacers are thus solved by the present invention. By the invention, an efficient deflection of the cooling medium towards the fuel rods is thus achieved. The formed steam will therefore be concentrated to the middle of the flow channels. An efficient cooling of the fuel rods is thereby achieved and the dryout performance of the reactor is improved.

The vane according to the present invention is preferably formed such that it creates a controlled vortex formation in the flow of the cooling medium, which formation is relieved from the vane at the upper part of the vane.

According to an embodiment of the invention, the deflecting member comprises a plane or some what bent base portion which has an extension in a vertical direction, wherein the vane and the base portion form a continuous unit and the vane is folded-out from the base portion and thus meets the base portion along a line. By such a construction, the deflection member may be produced in a relatively simple manner, since it is folded-out from a base portion.

According to a further embodiment, the base portion constitutes a continuous unit together with the cell, wherein the vane is thus formed as a folded-out portion of the cell. By this embodiment, the deflecting member in the form of a vane may thus be produced in a relatively simple manner, since the deflecting member is formed as a part of the cell which holds the fuel rods in position.

According to a further embodiment, the vane is folded-out such that it forms an angle of about 75–120 degrees with the base portion. By this embodiment, it has become clear that a construction is achieved which has favourable flow properties.

According to a further embodiment, the base portion is configured and arranged such that, when the spacer is positioned for use in a nuclear boiling water reactor, it extends parallel to one of said neighbouring elongated elements. Since the base portion extends parallel to a neighbouring element, for example to a fuel rod, it has become clear that unwanted disturbing turbulence formations close to the base portion may be avoided.

According to a further embodiment of the invention, the vane extends towards and reaches about the middle of the flow channel. Hereby a favourable vortex formation is achieved around the middle of the flow channel such that the cooling medium is deflected out towards the neighbouring fuel rods.

According to another embodiment, the vanes are positioned asymmetrically in the flow channels. By this embodiment, a particularly favourable controlled vortex formation is achieved. It has thus become apparent that the vortices which are formed by symmetrically arranged vanes often disturb each other. The inventor of he present invention has thus realised that an asymmetrical positioning of the vanes in the flow channels leads to a more advantageous and more controlled vortex formation. It has thus become apparent that a controlled symmetrical vortex formation is obtained if the vanes are asymmetrically positioned in the flow channels.

According to another embodiment, there is only one vane per flow channel. The arrangement of only one vane per flow channel is thus an example of an asymmetrically arranged vane. Thereby a controlled vortex formation is achieved, which formation is not disturbed by vortices from any neighbouring deflecting members. It has thus become apparent that by arranging only one vane per flow channel, a controlled symmetrical vortex is obtained, which leads to an even and efficient cooling of the neighbouring fuel rods. At the same time a disturbing turbulence, which may lead to an unwanted pressure drop in the flow of the cooling medium through the fuel assembly, is avoided. A further advantage with only having one vane per flow channel is that it only requires a low amount of additional material in the spacer, and the process of production is simplified as well.

According to a further embodiment of the invention, the vane is plane. Such a vane is relatively easy-to produce and has also good vortex formatting properties.

According to a further embodiment of the invention, the vane is bent. Since the vane is somewhat bent, an advantageous vortex formation may be obtained without leading to a high pressure drop.

According to a further embodiment of the invention, the vane has a first edge which extends in at least a vertical direction and which is closer to the cell in its lower part than in its upper part and a second edge which extends in at least a horizontal direction and which meets that first edge in a corner portion. Hereby a relatively simple vane construction which works well is achieved.

According to a further embodiment of the invention, the first and the second edges are straight. Hereby a relatively easily producible vane with good vortex formation properties is achieved.

According to a further embodiment of the invention, the first or the second or both edges are bent. By a slight bend of the edges, the vane may be optimised from a flow technical point of view.

According to a further embodiment of the invention said corner portion is located at approximately the same level as or higher up than the portion of the second edge which is closer to the cell, such that a vortex formed by the vane in the flow of the cooling medium is relieved from the vane primarily at said corner portion. Hereby vortices acting against each other is avoided, which vortices could create an unwanted and uncontrolled turbulence in the flow channel.

According to a further embodiment, the vane is inclined between 5 and 30 degrees relative to a vertical plane. Such an inclination of the vane has been shown to lead to an advantageous vortex formation in the flow channel.

According to a further embodiment of the invention, the vane in a vertical direction reaches higher than the cells. Since the vane reaches higher than the cells, the vane is not much disturbed by the flow which is influenced by the structure of the spacer. Thereby a longer lasting vortex is formed by the vane. The vortex thus lasts a longer distance up in the flow channel, which leads to an improved cooling of the fuel rods.

According to a further embodiment of the invention, the vane in a vertical direction has an extension, which neither reaches essentially above or essentially below the cells. Preferably, the vane has an extension such that it does not reach above or below the cells at all. The vane is thus in this case formed completely within the extension of the spacer in a vertical direction. This construction has mechanical advantages. The vane may thus in this case easily be formed by a folded-out portion of the cells. Furthermore, the vane is arranged protected in the spacer such that it may not be damaged when the fuel rods are positioned in the spacer. At the same time also the fuel rods are protected from being damaged by a protruding vane when they are put in position in the spacer.

The invention also concerns a fuel assembly for a nuclear boiling water reactor, wherein the fuel assembly comprises a plurality of spacers according to any one of the proceeding embodiments. Thereby a fuel assembly is achieved which has the advantages which have been described above in connection with the embodiments of the spacer.

The invention also concerns a fuel assembly according to claim 19. By this embodiment an advantageous deflection of the flow of the cooling medium may be achieved even in flow channels which are not necessarily located in close connection to a spacer.

SHORT DESCRIPTION OF THE DRAWINGS

The present invention will now be explained by means of embodiments, given as examples, and with reference to the appendant drawings.

Figure 7:
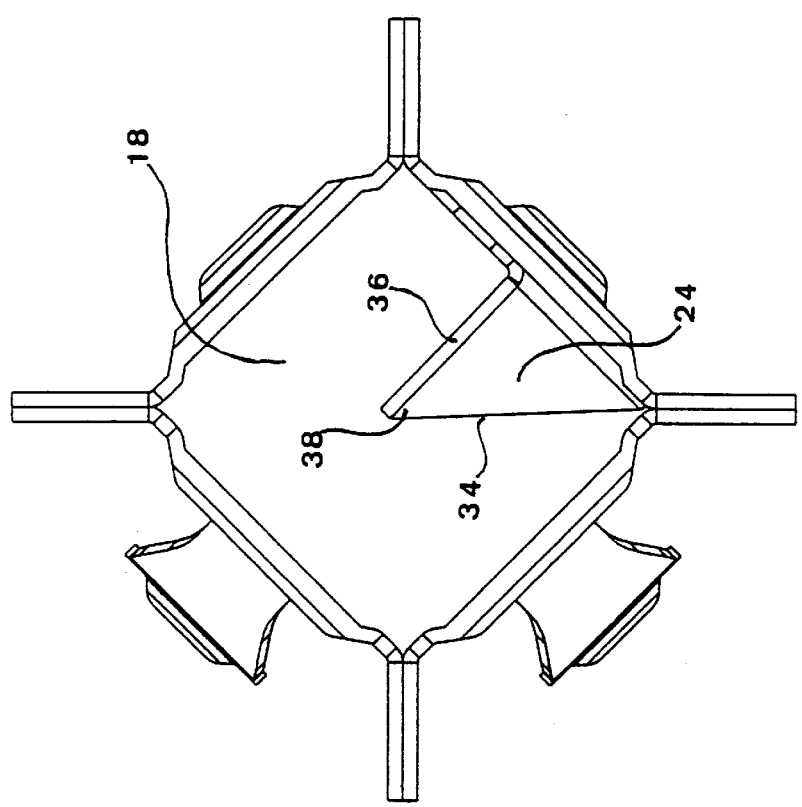
Figure 6:
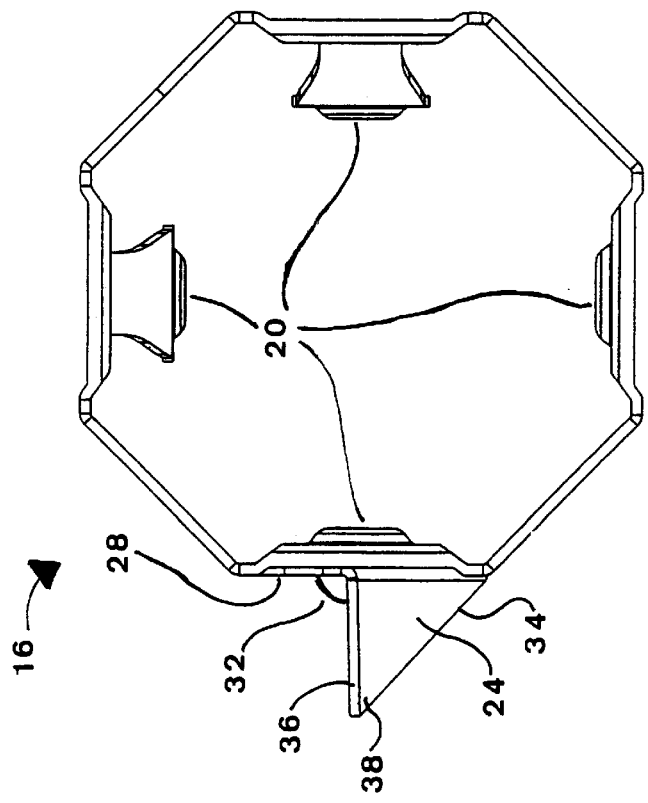

FIG. 1 shows schematically a sectional view of a fuel assembly for a nuclear boiling water reactor, FIGS. 2a and b show perspective views of examples of spacers, FIG. 3 shows a side view of a part which may be formed to a deflecting member which may form part of the invention, FIG. 4 shows a perspective view of a cell for a spacer according to the present invention, FIG. 5 shows a side view of such a cell, FIG. 6 shows a view from above of such a cell, FIG. 7 shows a flow channel between four cells seen from above.

FIG. 1 shows an example of a previously known fuel assembly 10 which has already been described above. FIG. 2 shows examples of spacers 14 according to the prior art. FIG. 2a shows here an example of sleeve-formed cells 16 which are welded together. FIG. 2b shows another kind of spacer 14 where the cells 16 are shaped as relatively open elements with support points and opposite resilient members which hold the fuel rods and other parallelly extending elongated elements in position. Although the present invention here below is described primarily in connection with the second kind of cells 16, i.e. similar to those which may be seen in FIG. 2b, it should be noted that the invention in no way is limited to such a kind of cells 16. The invention may thus also be applied to the kind of cells 16 which is shown in FIG. 2a. Also other kinds of cells 16 for spacers 14 may be formed according to the invention. For example, there are spacer cells 14 which consist of completely round tubes which are welded together.

FIG. 3 shows a side view of an example of a part which may be formed to a deflecting member 22. The shown part may be produced from a thin metal sheet in some now commonly used material, such as a nickel-based alloy (Inconel), stainless steel or a zirconium alloy. A deflecting member 22 may be formed in that the shown part is folded along the line 30 in such a manner that the right part in the figure is folded away from the plane of the drawing and forms an angle of about 75°–120° with the left part in the figure. The right part thereby forms a vane 24 with a first edge 34 and a second edge 36, which edges meet in a corner portion 38. The left part forms a base portion 28. The base portion 28 may now be arranged vertically next to a flow channel 18 in a spacer 14 or in another part of the fuel assembly 10. The base portion 28 may for example be point-welded to a spacer cell 16, such that the vane 24 extends from the cell 16 into the neighbouring flow channel 18. With a suitable inclination of the vane 24 relative to a vertical plane 26 (see FIG. 5) a controlled vortex formation is formed in a cooling medium flowing in the flow channel 18, which vortex formation is relieved from the vane 24 at the upper part of the vane, primarily at the corner portion 38.

FIG. 4 shows an example of one kind of spacer cell 16 for an elongated element. A number of such cells 16 are combined in a manner known by the person skilled in the art to a spacer 14 of similar kind to that shown in FIG. 2b. As has been mentioned above, a fuel assembly 10 is usually positioned such that the fuel rods 12 extend in a vertical direction. Thereby also the cells 16 in the spacer 14 are directed in a vertical direction. In connection with such a vertically positioned fuel assembly 10 it is thus clear what is ment by upwards, downwards, vertical and horizontal. These concepts will therefore be used in this description and in the following claims. It should however be pointed out that the fuel assembly 10 or the fuel rods 12 not necessarily must be positioned completely vertically. This description and the following claims are therefore not limited to such a vertically arranged fuel assembly 10.

FIGS. 4 and 5 thus show a cell 16 for a spacer 14. In a usual vertically arranged fuel assembly 10, the cells 16 thus extend in a vertical direction. The upper parts in FIGS. 4 and 5 thus correspond to the upper parts when the cells 16 are positioned in a spacer 14 for a fuel assembly 10 which has en extension in the vertical direction. FIG. 6 shows such a cell 16 seen from above and FIG. 7 shows a flow channel 18 which is formed by four neighbouring cells 16. With reference to the figures, the invention will now be more closely described.

A cell 16 of this kind usually has a number of support points 20. Some of these support points have a resilient function for holding the elongated elements, for example the fuel rods 12, in predetermined positions in the fuel assembly 10. The deflecting member 22 which forms part of a spacer 14 according to the invention may form a part which separate from the cell 16 or may form one integrated unit with the cell 16. In the now described embodiment, the deflecting member 22 forms an integrated unit with the cell 16. The deflecting member 22 comprises a vane 24. The vane is inclined relative to a vertical plane 26 (see FIG. 5). A suitable angle of inclination depends, inter alia, on which kind of cooling medium is used in the reactor and on the speed of flow of the cooling medium. A suitable angle of inclination is normally between 5° and 30°. It has been found that a particularly suitable angel of inclination is between 10° and 25°. In the here described embodiment, the deflecting member 22 also includes a base portion 28. The base portion 28 may, but need not, form a unit with the cell 16. The vane 24 may hereby, as is shown in the figures, be formed as a folded-out continuation of the base portion 28. According to such an embodiment, the vane 24 thus meets the base portion 28 along a line 30. As can be seen in the figures, the vane 24 is wider in its upper part than in its lower part. The vane 24 extends in a direction from a cell 16 into the neighbouring flow channel 18 (this can clearly be seen in FIG. 7). Suitably, the vane 24 is folded-out from the base portion 28 such that an angle 32 of about 75°–120°, for example 90°–100°, is formed therebetween.

According to the shown embodiment, the vane 24 has a first edge 34 and a second edge 36. The first edge 34 and the second edge 36 meet in a corner portion 38. The second edge 36 is preferably formed to extend horizontally, but also an inclination relative to a horizontal plane is possible. In the shown embodiment, the first 34 and the second 36 edges are straight. Since the vane 24 is inclined relative to a vertical plane 26, an overpressure is formed on the lower side of the vane 24 by the flowing cooling medium (which normally flows upwards in the figures). In FIG. 5, the vane is directed out towards the viewer. The first edge 34 is thus shown here. In this figure, the lower side of the vane 24 is indicated by 40 and the upper side of the vane 24 is indicated by 42. In the flowing cooling medium, a higher pressure is thus formed on the lower side 40 of the vane 24 than on the upper side 42 of the vane 24. This has as a consequence that the cooling medium, in order to equalize the pressure difference, flows from the lower side 40 of the vane 24 around the first edge 34 to the upper side 42 of the vane 24. A vortex is thus formed at the first edge 34 of the vane 24. Since the cooling medium flows upwards, the so formed vortex or, vortices are relieved from the vane 24 at the upper part of the vane, i.e. close to the corner portion 38. If the vane extends in towards and reaches about the middle of the flow channel (see FIG. 7), then the vortex is thus relieved from the vane approximately in the middle of the flow channel. It should be noted that when here the middle of the flow channel 18 is mentioned, then this does not necessarily mean also in the middle as seen in a vertical direction, i.e. the vane 24, may also be formed to project up from the spacer 14 and to still reach into the middle of the axial extension of the flow channel 18. Since a controlled vortex formation in this manner is produced by the deflecting member in the axial centre of the flow channel 18, a controlled distribution of the cooling medium out towards the neighbouring parallelly extending elongated elements, for example the fuel rods 12, is achieved.

Suitably, the vane 24 or the vanes are positioned asymmetrically in the flow channels 18. In the described embodiment, there is only one vane 24 in the flow channel 18 (see FIG. 7). Such an asymmetrical positioning of the vane 24 in the flow channel 18 has several advantages. The vortex which is formed by the vane in the flowing cooling medium is not disturbed by vortices from any other closely positioned vanes. By only using one vane 24 in the flow channel 18, the vane 24 does not cause any high pressure drop in the flowing cooling medium even if the vane 24 is comparatively large. Similarly, since the vane 24 has a relatively small angle of inclination against the vertical plane 26, the vane 24 does not cause any higher pressure drop in the flow channel 18 even if the vane 24 is relatively long. Since the vane 24 is formed as a folded-out portion directly in the metal sheet of the spacer cell 16, a mechanically very stable construction is achieved. Furthermore, the base portion 28 of the vane 24 may thereby consist of a vertical part of the cell 16 which has the advantage that unwanted vortex or turbulence formation at the base portion 28 is avoided. Thereby a controlled vortex may be formed by the vane 24, which vortex is not essentially disturbed by other turbulence. The base portion 28 of the deflecting member 22 may also be formed to be slightly bent in order to correspond to the bent surface of the elongated element which is held in place by the cell 16. The spacer according to the invention may for example be made in a zirconium alloy or in other presently common materials such as Inconel or stainless steel.

With a spacer 14 with a deflecting member 22 according to the invention, several advantages are thus achieved. Since the vane 24 may be made to be relatively long with a relatively small angle between the vane 24 and a vertical plane 26, an orderly vortex formation may thus be achieved, which vortex formation has a clear net rotational movement.

The relatively random turbulence which has been created by previously known constructions of deflecting members 22 may thereby be avoided. The orderly vortex formation leads to the effect that the cooling medium is moved out towards the elongated elements, and the steam which is formed in the fuel assembly next to the fuel rods 12 will thus be concentrated close to the middle of the flow channels 18. By the invention, an efficient cooling of the fuel rods 12 is thus achieved. The fuel assembly 10 and thereby the nuclear boiling water reactor thus achieve an improved dryout performance.

It should be noted that the deflecting member 22 does not need to be positioned at or formed in a cell 16 which holds the elongated elements in position. The deflecting member 22 may also be positioned close to or formed in the metal sheet of the frame of the spacer 14; i.e. the metal sheet which constitutes the outer limitation of the spacer 14.

As has been previously explained it is also possible to arrange the vanes in a separate structure (as so-called intermediate spacer) which does not support the rods but which has the purpose to hold all the vanes in accurate positions between the rods. The supporting function and the vortex formation function are thereby separated, which, hopefully, results in a lower total pressure drop.

A deflecting member 22 according to the invention may also be positioned in another position in the fuel assembly 10 than at the spacer 14 or at a so-called intermediate spacer. In a fuel assembly 10, there are other kinds of flow channels. For example, there are types of fuel assemblies 10 which have so-called part length rods, i.e. fuel rods which do not extend along the whole fuel assembly 10 but which end at a lower level. Above such part length rods 12A (FIG. 1) a larger flow channel may thus be formed. Also in such a flow channel, deflecting members 22 according to the invention may be arranged. The principle is thereby the same as that which has been described above. That is, in order to achieve a controlled vortex formation, a long vane 24 with a relatively small inclination is used, which vane is positioned such that the vortex is relieved from the vane 24 close to the corner portion 38 of the vane 24, and, suitably, the vane 24 is arranged such that the vane 24 extends in towards the middle of the flow channel such that a controlled vortex is relieved from the vane 24 approximately in the middle of the flow channel. Such a deflecting member 22 may of course be constructed in accordance with the different embodiments which have been described above in connection with the spacer. As an example of such an application of the invention, the vane may be arranged in a spacer positioned at a level which is above the level where the part length rod ends. Above such a part length rod, a larger flow channel is formed. This flow channel, in this case thus consists of the cell in the spacer which is positioned above the part length rod and of the four neighbouring flow channels corresponding to the flow channels which are formed between the fuel rods when these reach up through the spacer. In such a larger flow channel, a vane may be arranged in the manner which has been described in the previous embodiments above. Since this flow channel is larger than the flow channels which have been described above, the vane which has been arranged in such a channel is suitably larger to a corresponding degree. The flow channel may comprise more than one vane. Suitably, the vanes are thereby asymmetrically arranged in the flow channel. Preferably, also this kind of flow channel comprises only one vane.

The present invention is not limited to the described embodiments but may be varied and modified within the scope of the following claims.

What is claimed is:

1. A fuel assembly for a nuclear boiling water reactor, the fuel assembly comprising a plurality of spacers wherein at least one of said spacers comprises a plurality of cells for holding parallel elongated elements extending through the cells or for allowing said elements to pass through the cells, wherein a plurality of flow channels are defined between the cells which flow channels allow a cooling medium to flow therethrough, wherein, when the fuel assembly is in use in a nuclear boiling water reactor, the elongated elements extend in an essentially vertical direction and the flow of the cooling medium takes place mainly in a vertical direction upwards, wherein at least one of said spacers comprises a plurality of deflecting members which are arranged to deflect the flow of the cooling medium, wherein said plurality of said deflecting members comprises a vane which extends in a direction from a cell into the neighboring flow channel, wherein the vane is inclined relative to a vertical plane, wherein the vane is wider in its upper part than in its lower part, wherein there is only one vane per flow channel, wherein the deflecting member also comprises a plane or somewhat bent base portion which has an extension in a vertical direction, wherein the vane and the base portion form a continuous unit, wherein the vane is folded-out from the base portion and thus meets the base portion along a line, wherein the base portion constitutes a continuous unit together with a cell, wherein the vane is formed as a folded-out portion of the cell, and wherein the vane is folded-out such that it forms an angle of about 75–120 degrees with the base portion.

2. A fuel assembly according to claim 1, characterized in that the base portion is configured and arranged such that, when the spacer is positioned for use in a nuclear boiling water reactor, it extends parallel to one of said neighboring elongated elements.

3. A fuel assembly according to claim 1, characterized in that the vane extends towards and reaches about the middle of the flow channel.

4. A fuel assembly according to claim 1, characterized in that the vane is planar.

5. A fuel assembly according to claim 1, characterized in that the vane is bent.

6. A fuel assembly according to claim 1, characterized in that the vane has a first edge which extends in at least a vertical direction and which is closer to the cell in its lower part than in its upper part and a second edge which extends in at least a horizontal direction and which meets the first edge in a corner portion.

7. A fuel assembly according to claim 6, characterized in that the first and second edges are straight.

8. A fuel assembly according to claim 6, characterized in that at least one of the first and the second edges is bent.

9. A fuel assembly according to claim 8, characterized in that said corner portion is located at approximately the same level as or higher up than the portion of the second edge which is closer to the cell, such that a vortex formed by the vane in the flow of the cooling medium is relieved from the vane primarily at said corner portion.

10. A fuel assembly for a nuclear boiling water reactor, the fuel assembly comprising a plurality of spacers wherein at least one of said spacers comprises a plurality of cells for holding parallel elongated elements extending through the cells or for allowing said elements to pass through the cells, wherein a plurality of flow channels are defined between the cells which flow channels allow a cooling medium to flow therethrough, wherein, when the fuel assembly is in use in a nuclear boiling water reactor, the elongated elements extend in an essentially vertical direction and the flow of the cooling medium takes place mainly in a vertical direction upwards, wherein at least one of said spacers comprises a plurality of deflecting members which are arranged to deflect the flow of the cooling medium, wherein said plurality of said deflecting members comprises a vane which extends in a direction from a cell into the neighboring flow channel, wherein the vane is inclined relative to a vertical plane, wherein the vane is wider in its upper part than in its lower part, wherein there is only one vane per flow channel, wherein the vane has a first edge which extends in at least a vertical direction and which is closer to the cell in its lower part than in its upper part and a second edge which extends in at least a horizontal direction and which meets the first edge in a corner portion, and wherein said corner portion is located at approximately the same level as or higher up than the portion of the second edge which is closer to the cell, such that a vortex formed by the vane in the flow of the cooling medium is relieved from the vane primarily at said corner portion.

11. A fuel assembly for a nuclear boiling water reactor, the fuel assembly comprising a plurality of spacers wherein at least one of said spacers comprises a plurality of cells for holding parallel elongated elements extending through the cells or for allowing said elements to pass through the cells, wherein a plurality of flow channels are defined between the cells which flow channels allow a cooling medium to flow therethrough, wherein, when the fuel assembly is in use in a nuclear boiling water reactor, the elongated elements extend in an essentially vertical direction and the flow of the cooling medium takes place mainly in a vertical direction upwards, wherein at least one of said spacers comprises a plurality of deflecting members which are arranged to deflect the flow of the cooling medium, wherein said plurality of said deflecting members comprises a vane which extends in a direction from a cell into the neighboring flow channel, wherein the vane is inclined relative to a vertical plane, wherein the vane is wider in its upper part than in its lower part, wherein there is only one vane per flow channel, wherein the vane has a first edge which extends in at least a vertical direction and which is closer to the cell in its lower part than in its upper part and a second edge which extends in at least a horizontal direction and which meets the first edge in a corner portion, and wherein the vane is inclined between 5 and 30 degrees relative to a vertical plane.

12. A fuel assembly for a nuclear boiling water reactor, the fuel assembly comprising a plurality of spacers wherein at least one of said spacers comprises a plurality of cells for holding parallel elongated elements extending through the cells or for allowing said elements to pass through the cells, wherein a plurality of flow channels are defined between the cells which flow channels allow a cooling medium to flow therethrough, wherein, when the fuel assembly is in use in a nuclear boiling water reactor, the elongated elements extend in an essentially vertical direction and the flow of the cooling medium takes place mainly in a vertical direction upwards, wherein at least one of said spacers comprises a plurality of deflecting members which are arranged to deflect the flow of the cooling medium, wherein said plurality of said deflecting members comprises a vane which extends in a direction from a cell into the neighboring flow channel, wherein the vane is inclined relative to a vertical plane, wherein the vane is wider in its upper part than in its lower part, wherein there is only one vane per flow channel, wherein the vane has a first edge which extends in at least a vertical direction and which is closer to the cell in its lower part than in its upper part and a second edge which extends in at least a horizontal direction and which meets the first edge in a corner portion, and wherein the vane is inclined between 5 and 30 degrees relative to a vertical plane.

13. A fuel assembly according to claim 12, characterized in that the vane in a vertical direction reaches higher than the cells.

14. A fuel assembly according to claim 12, characterized in that the vane in a vertical direction has an extension which neither reaches essentially above or essentially below the cells.

15. A fuel assembly for a nuclear boiling water reacter, the fuel assembly comprising a plurality of spacers wherein at least one of said spacers comprises a plurality of cells for holding parallel elongated elements extending through the cells or for allowing said elements to pass through the cells, wherein a plurality of flow channels are defined between the cells which flow channels allow a cooling medium to flow therethrough, wherein, when the fuel assembly is in use in a nuclear boiling water reactor, the elongated elements extend in an essentially vertical direction and the flow of the cooling medium takes place mainly in a vertical direction upwards, wherein at least one of said spacers comprises a plurality of deflecting members which are arranged to deflect the flow of the cooling medium, wherein said plurality of said deflecting members comprises a vane which extends in a direction from a cell into the neighboring flow channel, wherein the vein is inclined relative to a vertical plane, wherein the vane is wider in its upper part than in its lower part, wherein there is only one vein per flow channel, wherein the deflecting member also comprises a plane or somewhat bent base portion which has an extension in a vertical direction, wherein the vane and the base portion form a continuous unit, wherein the vein is folded-out from the base portion and thus meets the base portion along a line, and wherein the vein is inclined between 5 and 30 degrees relative to a vertical plane.

* * * * *

UNITED STATES PATENT AND TRADEMARK OFFICE
CERTIFICATE OF CORRECTION

PATENT NO. : 6,415,011 B1
DATED : July 2, 2002
INVENTOR(S) : Styre Helmersson

It is certified that error appears in the above-identified patent and that said Letters Patent is hereby corrected as shown below:

Column 10,
Line 10, "comer" should read -- corner --.
Lines 59-63, "wherein…portion" should be deleted.

Column 12,
Lines 5, 7, 11 and 13, "vein" should be -- vane --.

Signed and Sealed this

Ninth Day of September, 2003

JAMES E. ROGAN
*Director of the United States Patent and Trademark Office*